Figure 1:
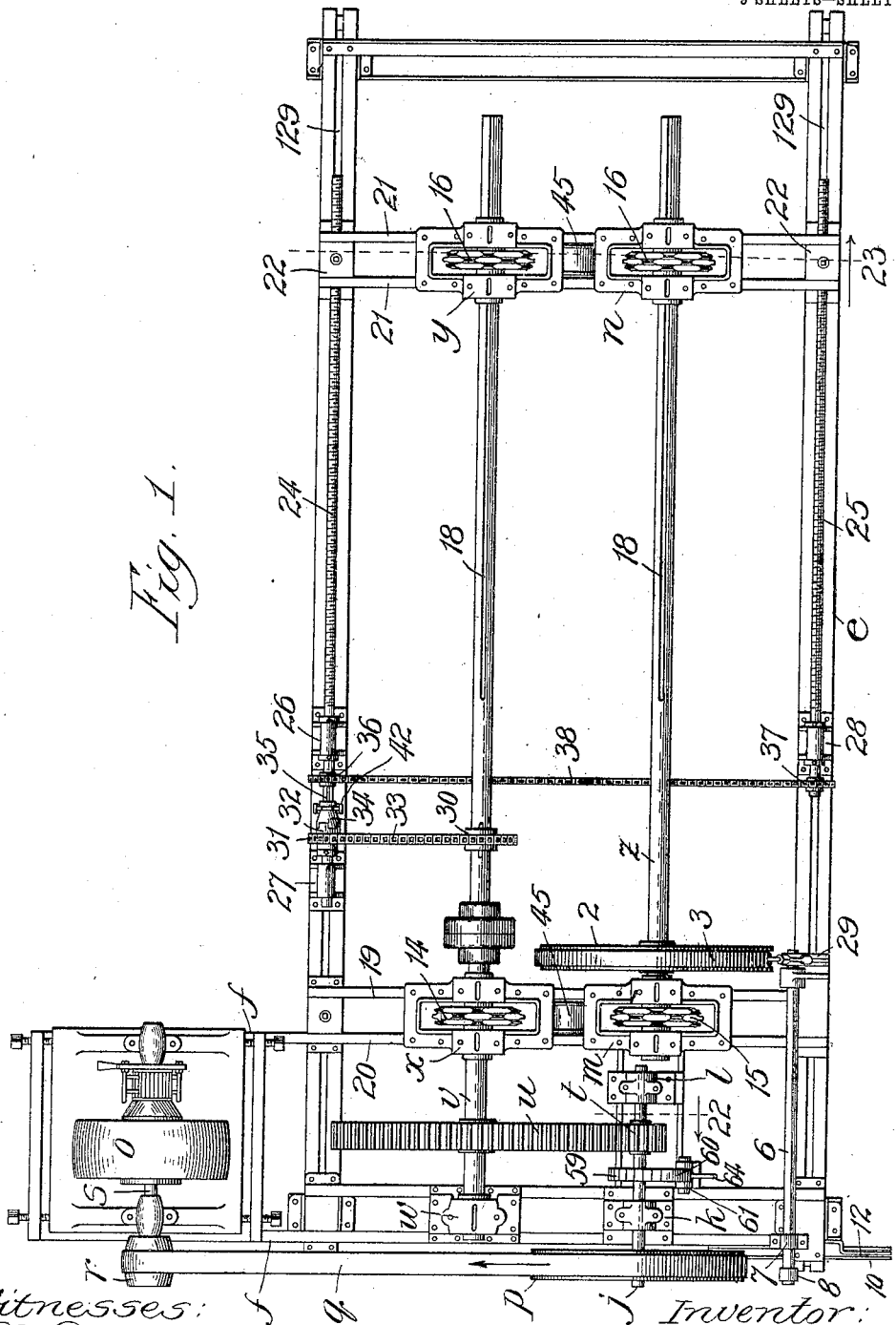

No. 822,035.  
PATENTED MAY 29, 1906.  
F. H. ADAMS.  
FLUE RATTLER.  
APPLICATION FILED APR. 24, 1905.  
9 SHEETS—SHEET 1.

Witnesses:  
Inventor:  
Frank H. Adams,  
By Thomas F. Sheridan,  
Att'y

No. 822,035. PATENTED MAY 29, 1906.
F. H. ADAMS.
FLUE RATTLER.
APPLICATION FILED APR. 24, 1905.

9 SHEETS—SHEET 4.

Witnesses:
Inventor:
Frank H. Adams,
By Thomas F. Sheridan,
Att'y

No. 822,035. PATENTED MAY 29, 1906.
F. H. ADAMS.
FLUE RATTLER.
APPLICATION FILED APR. 24, 1905.
9 SHEETS—SHEET 5.
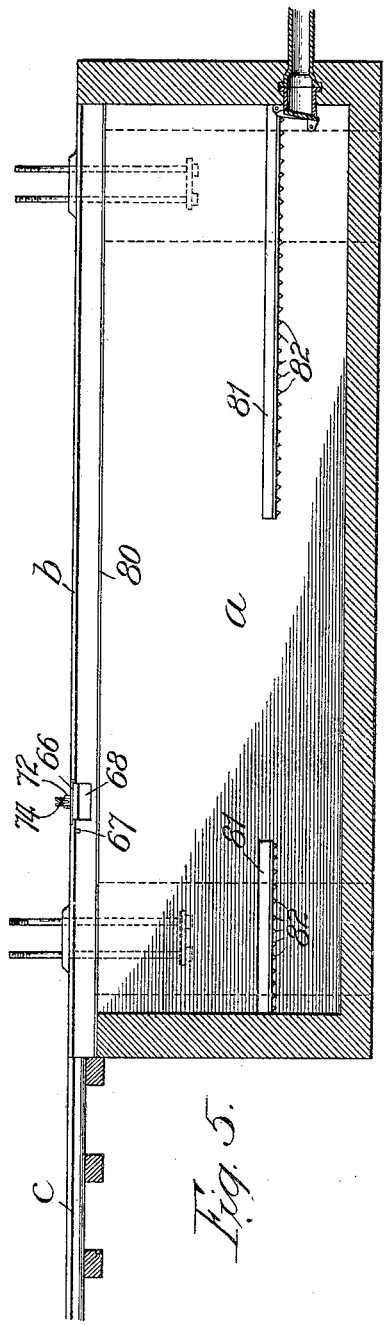
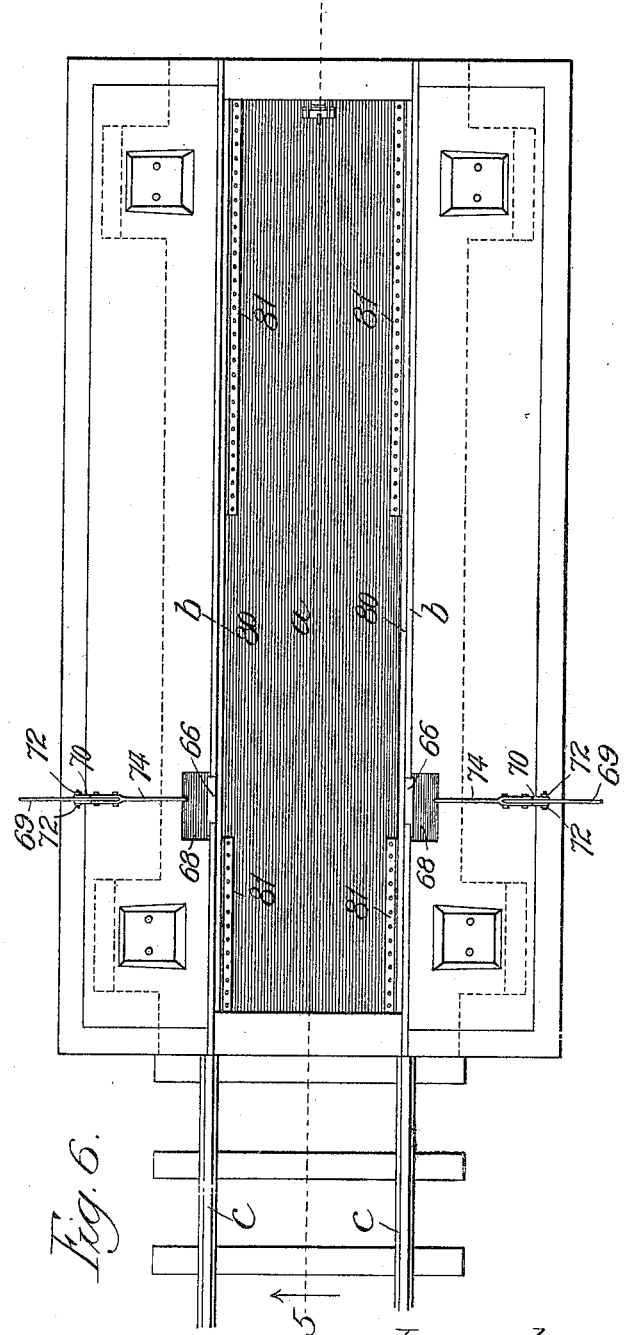
Witnesses:
Inventor:
Frank H. Adams,
By Thomas F. Sheridan,
Att'y No. 822,035. PATENTED MAY 29, 1906.
F. H. ADAMS.
FLUE RATTLER.
APPLICATION FILED APR. 24, 1905.
9 SHEETS—SHEET 6.
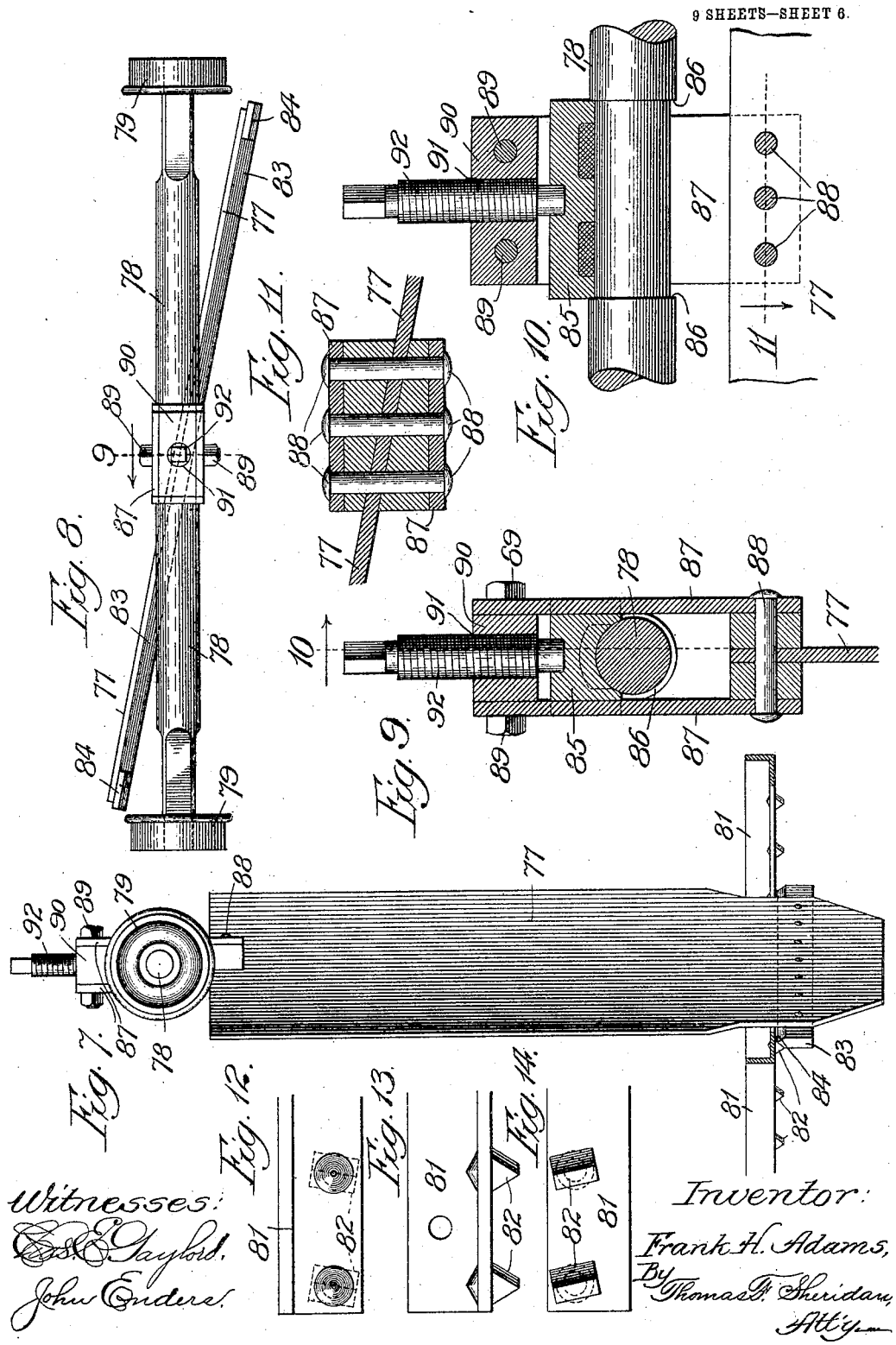
Witnesses:
Inventor:
Frank H. Adams,
By Thomas F. Sheridan,
Att'y

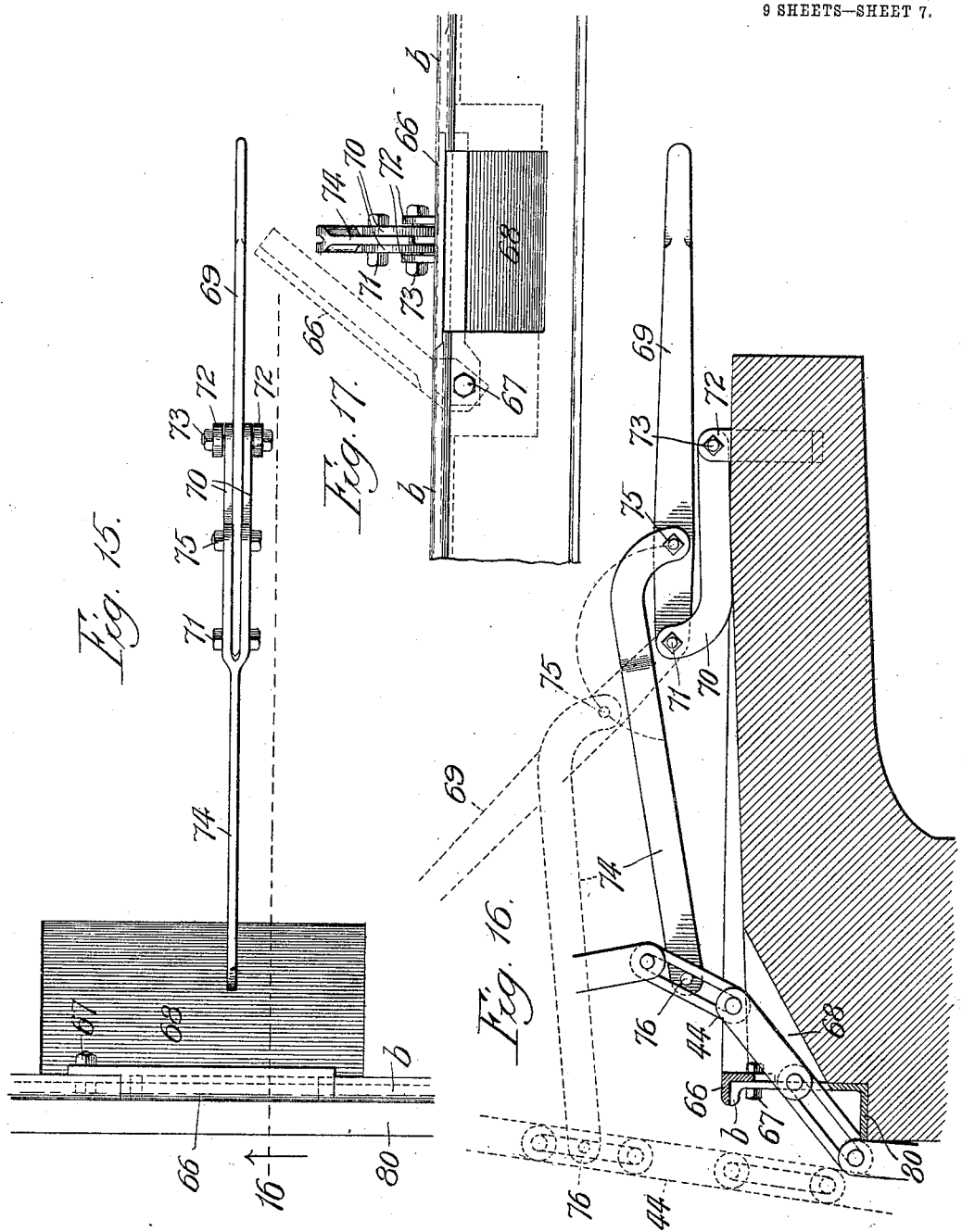

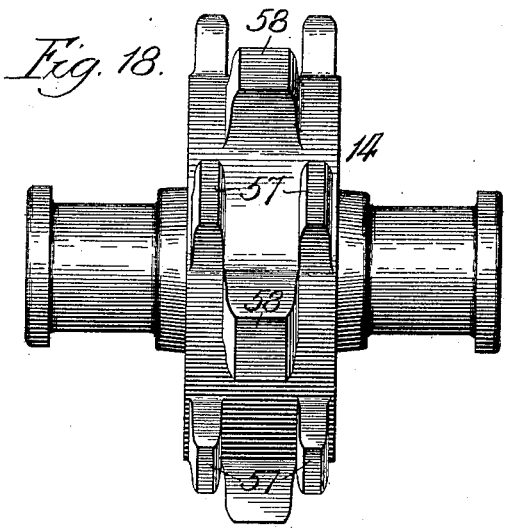
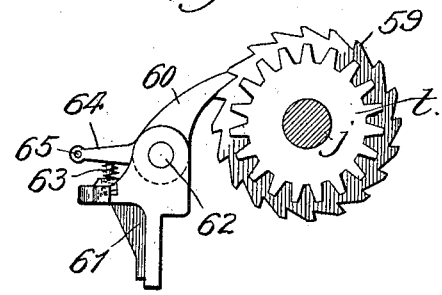
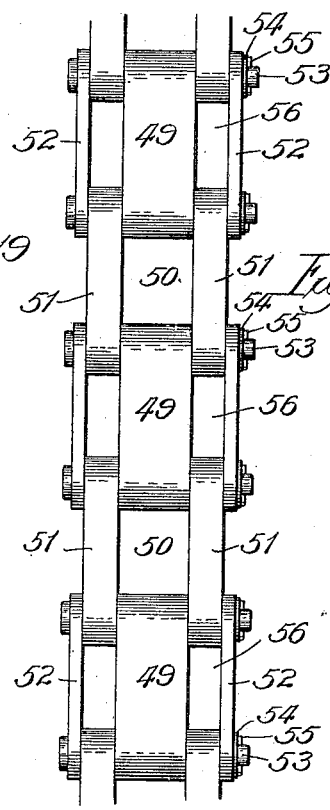
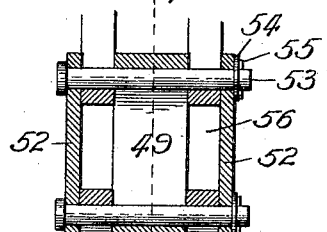
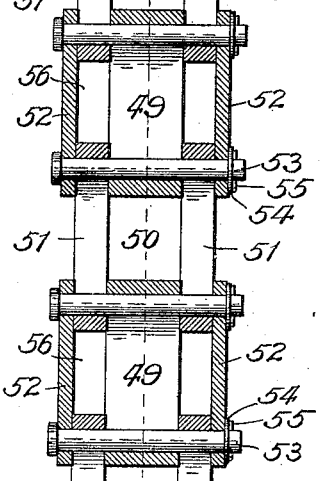
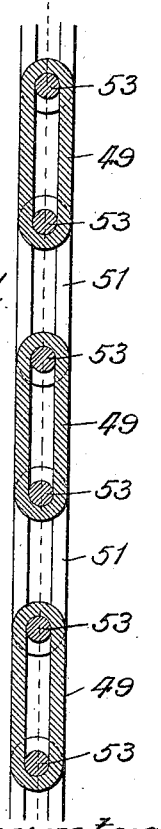

No. 822,035. PATENTED MAY 29, 1906.
F. H. ADAMS.
FLUE RATTLER.
APPLICATION FILED APR. 24, 1905.
9 SHEETS—SHEET 9.
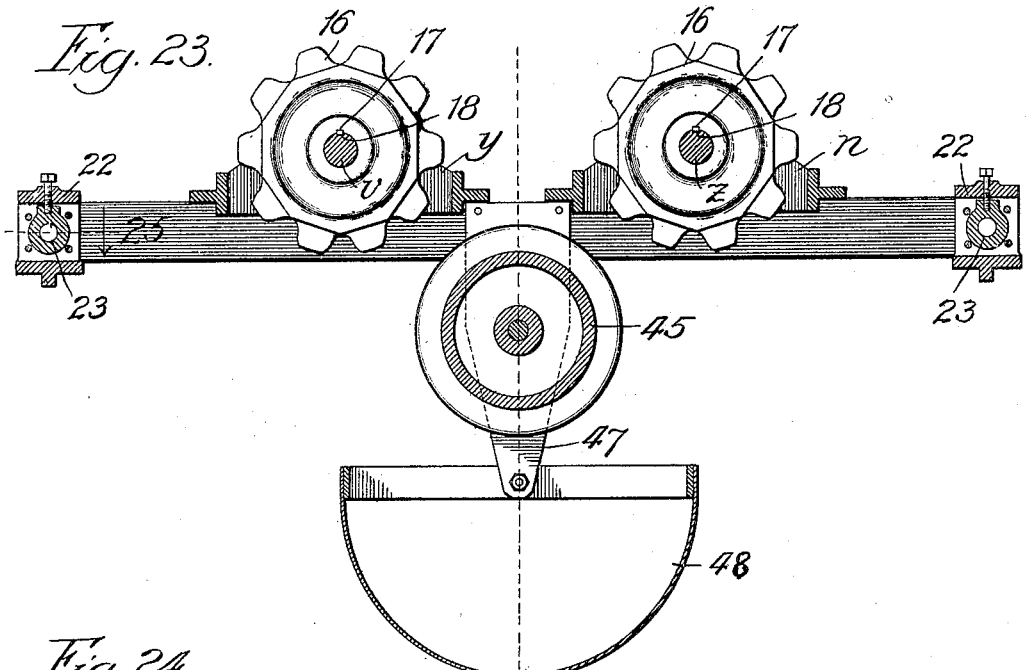
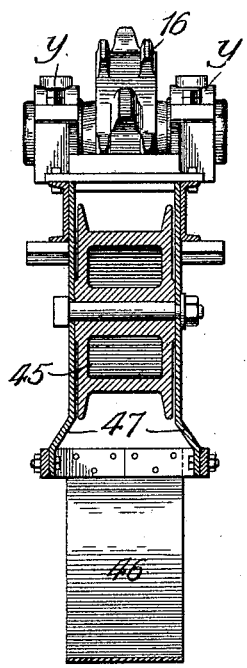
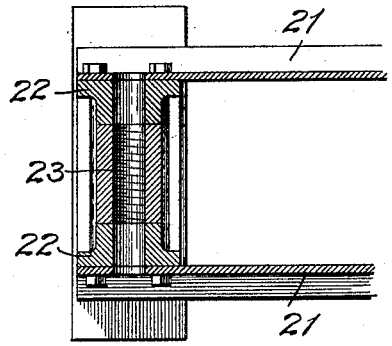
Witnesses:
Inventor:
Frank H. Adams.
By Thomas F. Sheridan
Att'y

UNITED STATES PATENT OFFICE.

FRANK H. ADAMS, OF TOPEKA, KANSAS.

FLUE-RATTLER.

No. 822,035.  Specification of Letters Patent.  Patented May 29, 1906.

Application filed April 24, 1905. Serial No. 257,248.

*To all whom it may concern:*

Be it known that I, FRANK H. ADAMS, a citizen of the United States, residing at Topeka, in the county of Shawnee and State of Kansas, am the inventor of certain new and useful Improvements in Flue-Rattlers, of which the following is a specification.

My invention relates to that class of flue-rattlers having traveling-chain mechanism forming loop portions adapted to contain the flues to be operated upon.

It relates particularly to the means for loading and unloading the flues and raising and lowering them into and out of the tank and for rattling or tumbling them against one another to remove the scale or sediment therefrom.

The principal object of my invention is to provide a simple, economical, and efficient flue-rattler.

A further object is to provide a flue-rattler with suitable means for rolling or rattling the flues, in combination with suitable means for loading and unloading them and for raising and lowering them into and out of the tank or pit in which they are operated upon.

Further objects are to provide suitable chain mechanism for rolling or rattling the flues, mechanism for driving, raising, and lowering the chain-loops in which the flues are contained, means for holding the flues in raised position to permit cars to be moved into and out of position to receive the flues, and to provide means for enabling the chains to be readily placed in position around the flues—as, for instance, by spreading one of the loops of the chain, so as to permit the car with the flues thereon to be passed through such loop.

A further object is to provide suitable means for varying the distance between the chains to correspond to the length of the flues to be operated upon.

A further object is to provide suitable means for keeping the flues in position longitudinally while being operated upon.

A further object is to provide means for enabling the flues to be loaded and unloaded, raised, and lowered into and out of the tank and the flue-supporting chains to be moved to different distances from each other, as required by the differences in the length of the flues to be operated upon, all by means of the same motive power and a single organized machine.

Other and further objects of the invention will appear from an examination of the drawings and the following description and claims.

The invention consists in the features, combinations, and details of construction hereinafter described and claimed.

Figure 2:
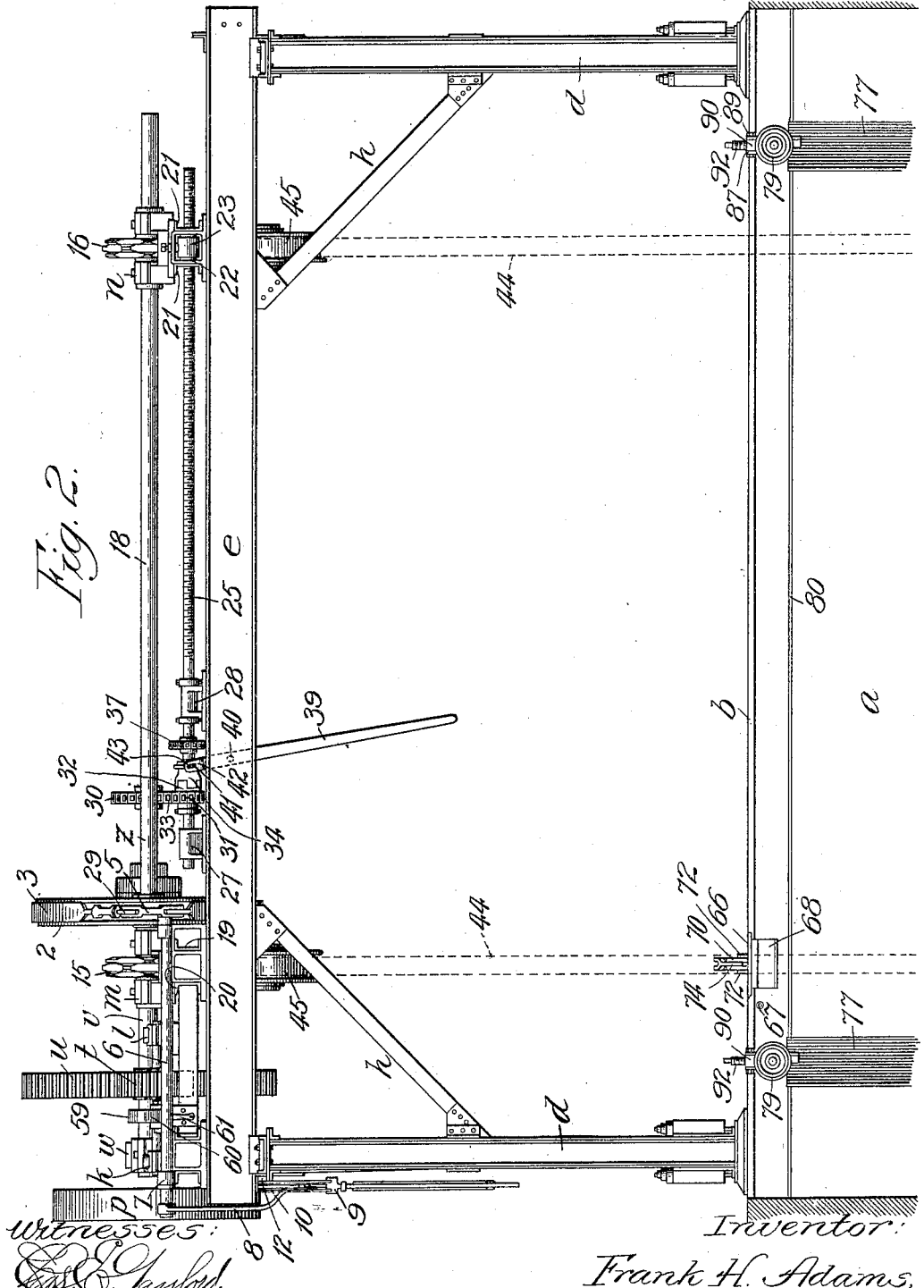
Figure 3:
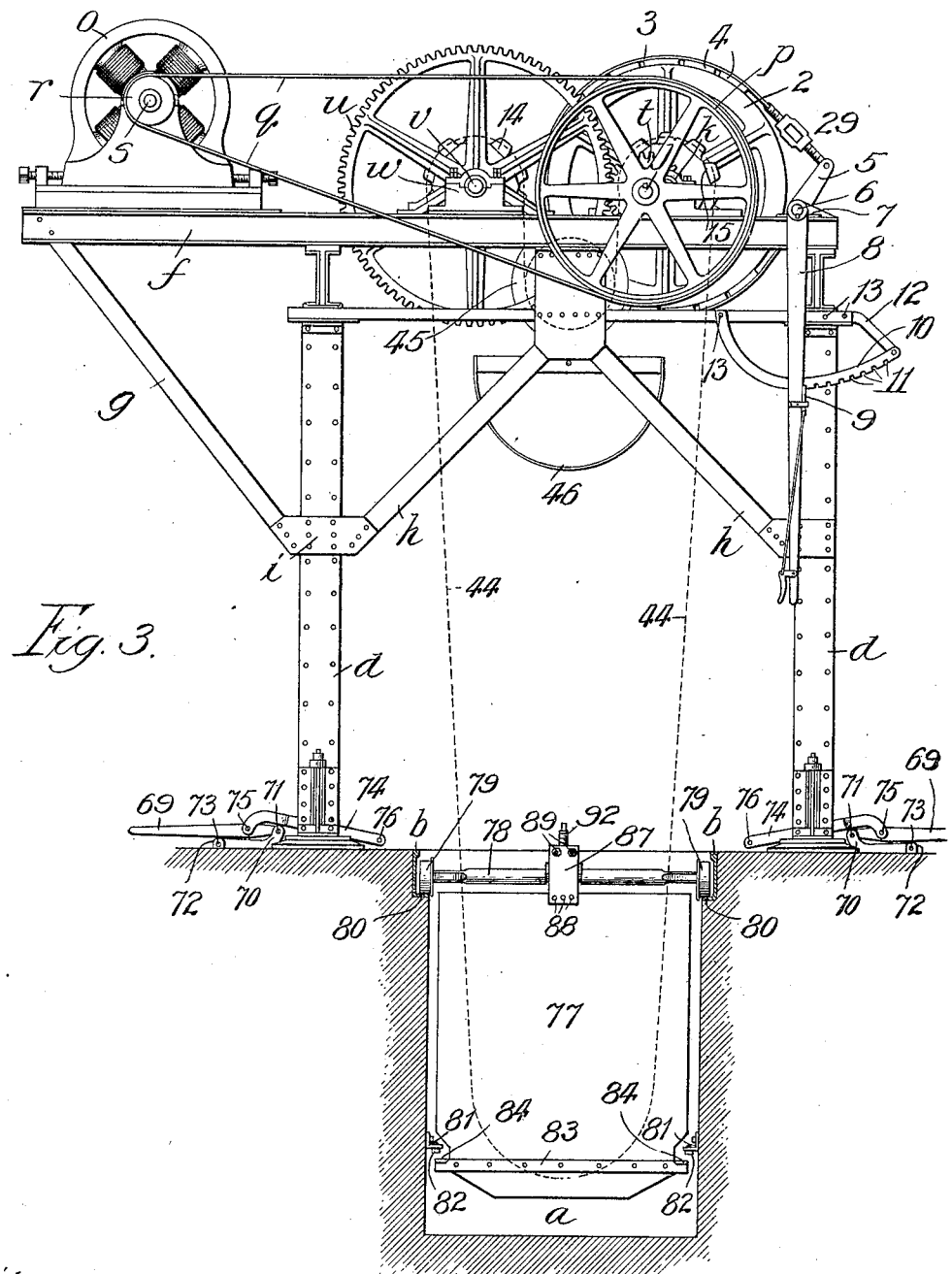
Figure 4:
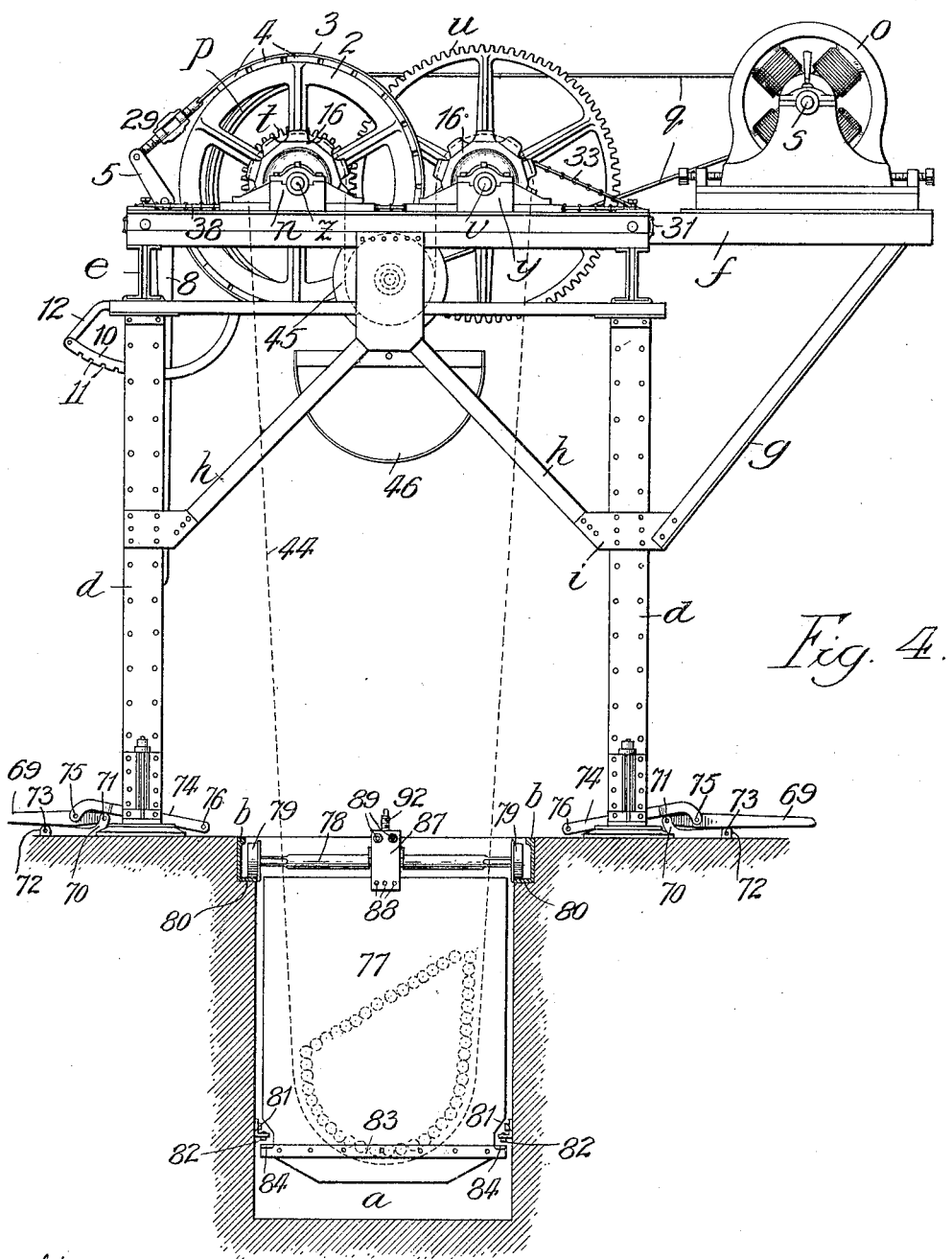

In the accompanying drawings, Figure 1 is a plan view of a machine constructed in accordance with my improvements; Fig. 2, a side elevation thereof; Fig. 3, a front end elevation of a machine, showing the tank in transverse section; Fig. 4, a rear end elevation of a machine, showing the tank in section; Fig. 5, a longitudinal sectional view in elevation, taken through the center of the tank on line 5 of Fig. 6 looking in the direction of the arrow; Fig. 6, a plan view of the tank and track, showing the bridged rails or removable track-sections; Fig. 7, a detail view, in side elevation, of one of the fenders for keeping the flues in position longitudinally; Fig. 8, a plan view of the fender shown in Fig. 7; Fig. 9, a detail sectional view in elevation of the mechanism for supporting and operating the fender; Fig. 10, a detail sectional view in elevation of the parts shown in Fig. 9, taken on line 10 of Fig. 9 looking in the direction of the arrow; Fig. 11, a sectional plan view in detail, taken on line 11 of Fig. 10, showing the means for connecting the fender to its support and holding it at an incline; Fig. 12, a plan view of a portion of one of the racks or toothed angles for holding the fenders in position and permitting them to be adjusted horizontally; Fig. 13, a side view in elevation of the parts shown in Fig. 12; Fig. 14, a bottom plan view of the rack or angle shown in Figs. 12 and 13; Fig. 15, a plan view in detail of the lever mechanism for spreading the flue-supporting chain, showing the pivoted track-section or bridged rail; Fig. 16, a sectional view in elevation of the parts shown in Fig. 15, taken on line 16 of said figure; Fig. 17, a detail view in elevation of the bridged rail, showing the rail in closed position in full lines and in open position for permitting the chain to pass therethrough in dotted lines; Fig. 18, a detail plan view of my improved sprocket-wheel for operating the flue-supporting chains; Fig. 19, a detail view of a portion of my improved flue-supporting chains; Fig. 20, a longitudinal sectional view of the chain shown in Fig. 19; Fig. 21, a central longitudinal sectional view of the chain shown in Figs. 19 and 20; Fig. 22, a detail view in elevation of the pawl-and-ratchet mechanism for preventing the backward movement of the gearing and the flue-supporting chains; Fig. 23, a detail view in elevation of the traveling carriage and the chain-supporting sprockets, showing the central idler-pulley and the mechanism for catching the slack of the flue-supporting chains; Fig. 24, a detail sectional elevation taken on line 24 of Fig. 23 looking in the direction of the arrow; and Fig. 25, a sectional plan view in detail of the threaded bearing-block by means of which the traveling carriage is connected with the threaded rods for operating it, taken on line 25 of Fig. 23 looking in the direction of the arrow.

In the art to which this invention relates it is well known that flues can be rolled or manipulated by means of chains forming loops in which the flues are suspended in a tank or vat containing liquid. It is very desirable, however, that means be provided whereby the chains for supporting and rolling or rattling the tubes may be adjusted or moved to different positions with relation to each other or spaced apart to correspond to the length of the flues to be operated upon. It is of course very desirable that this be accomplished without materially complicating the mechanism for loading and unloading or for raising and lowering the flues and without complicating or in any way diminishing the efficiency of the mechanism for rolling or manipulating the flues. It is also important that suitable means be provided for enabling the flues to be hauled into position within the chain-loops upon a push-car and for enabling the flues to be raised from the car, the car removed, the flues lowered into the tank and cleaned, and again raised and placed upon the car, all by means of one organized machine and preferably by means of the same motive power. It is also desirable that suitable means be provided for retaining the flues in position horizontally while being operated upon in the tank and also that means be provided for catching the slack or loose portions of the chains when the flues are raised out of the tank and that the chains for supporting and operating upon the flues be so suspended and the mechanisms for operating them so arranged that no part of such mechanisms—such as the sprocket-wheels, for instance—will be in the tank or on a plane below the level of the top of the tank, and whereby the mechanism for operating the chains and the chains themselves will be subjected to the least amount of frictional resistance to their operation.

In constructing a machine in accordance with my improvements I provide a tank $a$, which should be of the necessary dimensions to receive and contain the flues to be operated upon and the liquid in which such flues are to be immersed during the process of removing the scale, incrustations, or sediment therefrom. The walls of this tank may be formed of concrete or any desired material adapted to contain the liquid, and track-rails $b$ extend longitudinally of the tank along its opposite upper edges for supporting a car, which may be of any desired form and by means of which the flues to be operated upon are conveyed to and from the machine.

Track-rails $c$ lead from one or both ends of the track-rails $b$ in line therewith, so that the car which carries the flues may be rolled upon such tracks over the tank and removed, as desired. I have here shown car-track leading to but one end of the tank, as the objects of the invention can be efficiently accomplished by introducing and removing the car at the same end of the device.

A framework formed of columns $d$, longitudinal sills $e$, end sills $f$, and suitable braces $g$ and $h$, connected to the upright columns by means of brackets $i$, is mounted over the tank above described, such framework being preferably made entirely of metal. A stub-shaft $j$ is mounted in the framework in suitable bearings or brackets $k$ and $l$ and connected with a source of motive power, such as a dynamo $o$, by means of a pulley $p$, a belt $q$, and a pulley $r$ upon the main shaft $s$ of such dynamo. Upon this stub-shaft $j$ is mounted a spur-pinion $t$, which meshes with a gear-wheel $u$ upon the main driven shaft $v$, which is rotatably mounted in the main frame in suitable bearings $w$, $x$, and $y$.

Parallel with the main driven shaft $v$ and rotatably mounted in bearings $m$ and $n$ is a shaft $z$. This idler-shaft is provided with brake mechanism in the form of a friction brake-wheel 2, mounted thereon and in fixed relation thereto and having a friction-strap 3 of flexible material encircling such brake-wheel. Friction-blocks 4, riveted to this strap, engage the outer peripheral surface of the brake-wheel. One end of this friction-strap is secured to the framework at a point adjacent to the friction-wheel, and the opposite end is flexibly secured to a lever-arm 5 of a rock-shaft 6, which is rockingly mounted upon the supporting-framework in metallic bearings or brackets 7.

An operating-lever 8 is secured to one end of the brake-wheel rock-shaft and provided with a spring-pressed pawl 9, mounted thereon adjacent to a notched segment 10 and movable into and out of engagement with the notches 11 in such segment, the segment being secured to the framework by means of an arm portion 12 and rivets 13 in any ordinary and well-known manner. By this arrangement it will be readily seen that the rotation of the idler-shaft $z$ may be retarded and entirely stopped when desired during the rotation of the main driven shaft, causing the flue-supporting chain-loops to be raised or shortened by the same mechanism which drives them, as hereinafter more fully set forth.

The main driven shaft $v$, already described, is provided with a toothed sprocket-wheel 14 and the idler-shaft $z$ with a similarly-toothed idler sprocker-wheel 15, mounted in fixed relation to such shafts, respectively. Toothed sprockets 16 are slidably mounted upon each of such shafts, respectively, being movably connected thereto by means of feathers 17, which slidably engage longitudinal slots 18 in such shafts, so as to permit the sprocket-wheels to be moved longitudinally of the shafts and cause them to rotate therewith. Both of the sprocket-wheels on the idler-shaft will be designated as "idler-sprockets" in order to distinguish them from the sprockets upon the main driven shaft. The front ends of these shafts—that is to say, the ends nearest the gear-wheels—are supported upon transverse beams 19 and 20, which extend across the supporting-framework and form a part thereof. The beam 20 extends beyond the side of the main portion of the framework and forms a support for the dynamo, as shown in Fig. 1.

The bearings or castings which support the opposite ends of these shafts are movably mounted with relation to the main frame upon a carriage or movable transverse beam 21, formed of channel-irons, having end bearing-blocks 22, provided with threaded perforations 23 in engagement with threaded rods 24 and 25, respectively. These threaded rods extend longitudinally of the main frame at right angles to the carriage above described and are rotatably mounted in bearings 26, 27, and 28 upon the main frame. Grooves 129 in the frame receive corresponding track portions (not shown) on the carriage and form guides therefor.

In order to operatively connect the toothed rod 24 with the driven shaft $v$ and enable it to be disconnected therefrom when desired, a sprocket-wheel 30 is mounted upon and in fixed relation to the shaft $v$, and a sprocket-wheel 31, having a clutch member 32 in fixed relation thereto, is rotatably mounted upon the threaded rod 24, the sprocket-chain 33 being mounted upon and connecting such sprockets.

A movable clutch member 34 is slidably mounted upon the threaded rod 24, already described, and connected thereto by means of a feather or spline, (not shown), which enters a longitudinal slot 35 in the threaded rod, so as to permit the movement of such clutch member longitudinally of the rod and cause it to rotate therewith.

In order to connect the threaded rods 24 and 25 so that they will rotate simultaneously and at the same speed, sprocket-wheels 36 and 37 are mounted upon each of such rods, respectively, in fixed relation thereto and connected by means of a sprocket-chain 38. The clutch member 34 is operated by means of a lever 39, pivotally mounted in the main frame upon a pivot 40 and having an elongated perforation 41 in each of its arms 42 for receiving a pin or stud 43, which projects from the movable clutch member. Flue-supporting chains 44 are each mounted upon a pair of sprocket-wheels at opposite ends of the rotatable shafts $v$ and $z$, respectively, as shown in Fig. 2. The lower outer portion of each of these chains when in operative position forms a loop which extends downward from the outside of the chain-supporting sprocket-wheels into the tank and transversely thereof, encircling and supporting the flues to be operated upon. The upper portion or inner loop of each of these chains extends downward between the chain-supporting sprocket-wheels and around idler-pulleys 45, as shown in Figs. 3 and 4. One of these idler-pulleys is mounted between the chain-supporting wheels at the front end of the machine, as shown in Fig. 3, being rotatably supported in the main frame of the machine over a chain-receptacle in the form of a metallic trough or basket 46, and the other is mounted in a depending bracket 47, secured to the movable carriage and to a similar trough or bracket 48, which is movable with the carriage. These baskets or troughs form receptacles for containing the slack of the flue-supporting chains when the flue-containing loop portions of the chains are raised, as hereinafter described.

It is very desirable that the chains 44 be of sufficient width to provide a surface portion of large area for engaging the flues and that the chain be sufficiently thin to be very flexible, so as to occupy as little space as possible consistent with the requirements. The chain should also be so constructed that it will not kink or tangle when loosely deposited in the receptacles for containing the slack. It should fold evenly, so as to readily unfold when the slack is required in operation. It is also desirable that suitable sprocket-wheels for operating such chains be provided. In order to accomplish these objects, the chains 44 are each formed of broad thin central links 49, having spaces 50 therebetween, such links being connected by intermediate side links 51 on opposite sides thereof extending from the end of one center link to the end of the next adjacent center link, and outer links or braces 52, all perforated and mounted upon pins 53, which are headed at one end and provided with washers 54 and cotter-pins 55 at the other, as shown in Figs. 19, 20, and 21. This provides spaces 56 between the ends of the intermediate side links 51 on each side of the center links. The sprocket-wheels 14, 15, and 16, all of which are identical with the exception of the manner in which they are connected to the shafts, are each provided with a plurality of pairs of side teeth 57, which enter the spaces 56 between the intermediate and outer links of the chain, and center teeth 58 with broad faces occur between each pair of such side teeth in staggered relation thereto. The center teeth enter the spaces 50 between the ends of the center links.

In order to prevent the backward movement of the mechanism for reasons hereinafter more particularly set forth, a ratchet-wheel 59 is mounted upon the stub-shaft $j$, already described, in fixed relation thereto, and a spring-pressed pawl 60 is pivotally mounted upon the main frame by means of the bracket 61 and pivot 62, such pawl being provided with a spring 63 for holding it yieldingly in engagement with the ratchet and having an operating-lever arm 64, provided with a perforation 65 for receiving an operating-cord by means of which the pawl may be thrown out of engagement with the ratchet when desired.

In order to provide means for enabling a car containing the flues to pass through the loop portion of one of the supporting-chains, so as to enable the loading and unloading of the flues and the raising and lowering thereof to be readily accomplished, each of the track-rails upon opposite sides of the tank is provided with a pivoted bridge portion 66, pivotally attached to such rail by means of a bolt or pivot 67 and adapted to extend across an opening 68 in the rail, each of these rails being provided with a similar opening on opposite sides of the tank and directly opposite each other, as shown in Fig. 6. Adjacent to these openings or bridge portions of the rails on each side of the track and tank is a lever mechanism consisting of a main operating-lever 69, pivotally mounted upon a link 70, to which it is secured by means of a pivot 71, such link being mounted in a supporting bracket or stud 72 by means of a pivot or bolt 73, a link or lever 74 being pivotally secured to the main lever by means of a pivot 75 and provided at its outer swinging end with a pin 76, removably inserted through a perforation therein and adapted to engage the chain 44. These pins 76 may be inserted through one of the open links of the chain, if desired, as shown in Fig. 16, and the movement of the lever mechanism from the position shown in dotted lines in this figure to the positions shown in full lines will spread the chain to the outside of the track-rails, so as to permit the car with the flues to pass through the loop portion of such chain, the perforated portion of the bridge-rails being of course raised to permit the chain to be passed to the outside of the rail and lowered to permit the car to pass over the chain upon the rail and inside the chain-loop. I prefer to arrange these sets of levers adjacent to the flue-supporting chain, which is not movable longitudinally of the track—in other words, adjacent to the chain which is at the front end of the device.

In order to enable the flues to be held in position longitudinally during the operation of cleaning them or removing the scale or incrustations therefrom, a pair of fenders 77 are movably mounted adjacent to the opposite ends of the tank, respectively, each of such fenders extending when in operative position at an oblique angle transversely across the tank and substantially vertically from a point near the top to a point near the bottom of the tank. Each of these fenders is suspended from an axle 78, which is mounted upon and in fixed relation to flanged wheels 79, such axle extending across the tank and the wheels and axles being rotatably mounted upon the lower portions 80 of the track-rails $b$, already described.

Racks 81 in the form of angle-irons, having depending rack-teeth 82 on their under sides, extend longitudinally of the tank on opposite sides thereof and adjacent to the lower portion of each of these fenders. Each fender is provided with a detent-strip 83, having a wedge-shaped upper edge 84, adapted to engage the teeth of such racks when the fender is in raised position and to be disengaged from such teeth when the fender is lowered. In order to enable the fender to be raised into position to engage the rack-teeth and lowered so as to permit it to be moved backward or forward longitudinally of the tank to the desired position corresponding to the length of the flues to be operated upon, (the latter being easily accomplished by applying a wrench to the squared portion of axle 78,) each fender is mounted at its upper end upon a bearing-block 85, through which the axle 78 extends, the axle being provided with annular shoulders 86 for preventing the movement of the bearing-block and fender longitudinally of such shaft. Fender-supporting pieces 87 extend vertically above and below this bearing-block having their lower portions secured to the fender proper by means of pins 88 and their upper portions connected by means of bolts 89.

A filler portion 90 is provided with a central vertical threaded perforation 91, in which a similarly-threaded set-screw 92 is mounted, the lower end of such set-screw having its seat in the bearing-block 85, so that the rotation of the screw in one direction will raise the fender, with its detent-strip, into engagement with the racks or toothed angle-irons. The rotation of the screw in the opposite direction will lower the fender out of engagement with such racks.

In operation the flues to be operated upon are loaded upon a push-car, which may be of any desired type, and the flue-supporting chain at the front end of the device is spread to the outside of the track, as indicated in full lines in Fig. 16, so as to permit the car to be pushed through the loop portion of such chain into position between the flue-supporting chains.

Either before or after introducing the car with the flues contained thereon over the tank the rear flue-carrying chain is moved to the desired position corresponding to the length of the flues. This is accomplished by setting the motor in operation and operatively connecting the threaded rods with the driving-gear mechanism by moving the clutch-lever 39, with its clutch member, to the position shown in Fig. 2. The motor is reversible, and by turning the gear mechanism, and thereby the threaded rods, in the desired direction the carriage which supports the rear flue-carrying chain is moved horizontally to any desired position with relation to the front flue-carrying chain. When the chains are in the desired relative position, the clutch controlled by the lever 39 is released. The push-car, with its flues, being in position over the tank, the pivoted portions of the bridged rails are open, so as to permit the front flue-carrying chain to be raised. In order to raise the carrying-chains into engagement with the flues, and thereby raise the flues above the car, so as to permit the car to be withdrawn and the flues to be lowered, the mechanism is set in motion, so that the driving-belt will travel in the direction indicated by the arrow in Fig. 1. The brake upon the idler-shaft $z$ is then set, so as to prevent the rotation of such shaft and the idler sprocket-wheels thereon. The driving mechanism thus operates the main driven shaft $v$, so as to wind up the loops of the flue-supporting chains, depositing the slack of such chains in the troughs or baskets 46 and 48, respectively. The ratchet 59, with its pawl mechanism, prevents the backward movement of the mechanism when the flues are raised. The push-car having been removed, leaving the flues suspended in the chain-loops, they may be lowered by releasing the strap 3 from engagement with the friction brake-wheel 2 sufficiently to permit the rotation of the shaft $z$, so as to lower the side of the chain-loops supported by such shaft. The flues having been thus lowered into the tank, the brake should be entirely released, and the driving mechanism may then be set in operation in either direction, rotating or driving the endless flue-carrying chains, and thereby rolling the flues over and over in the tank in a sufficient quantity of liquid until they are thoroughly cleaned and the scale or incrustations removed therefrom.

The fenders, which extend diagonally across the opposite ends of the tank, as already described, prevent the movement of the flues longitudinally with relation to each other. In order to raise the flues out of the pit, substantially the same operation is employed as in the case of raising them upon the car in the first instance. In lowering them upon the car the same operation may be employed as in the case of lowering them into the pit or tank.

I claim—

1. In a mechanism of the class described, the combination of a framework, suspended chain mechanism movably mounted and having depending loop portions supported by such framework for raising and tumbling flues back upon each other in such loop portions, and means for raising and lowering such flue-carrying loop portions of the chains and thereby the flues contained therein, substantially as described.

2. In a mechanism of the class described, the combination of a framework, a plurality of suspended chains movably mounted and having depending loop portions supported by such framework, means for driving such chains and thereby raising and tumbling the flues contained therein back upon each other in the loops, and means for increasing and decreasing the length of the flue-containing loop portions of such chains, substantially as described.

3. In a mechanism of the class described, the combination of a framework, a plurality of suspended chains movably mounted and having depending loop portions supported by such framework, means for driving such chains and thereby raising and tumbling the flues contained therein back upon each other in the loops, mechanism for winding up the loop portions of the chains, and mechanism for holding a portion of each loop against the action of such winding mechanism, substantially as described.

4. In a mechanism of the class described, the combination of a framework, a plurality of suspended chains movably mounted and having depending loop portions supported by such framework, means for driving such chains and thereby raising and tumbling the flues contained therein back upon each other, means for increasing and decreasing the length of the flue-containing loop portions of such chains, and means for varying the distance between such chains, substantially as described.

5. In a mechanism of the class described, the combination of a framework, suspended chain mechanism movably mounted and having depending loop portions supported by such framework for raising and tumbling flues back upon each other in such loop portions, means for driving such chains, mechanism for moving the chains to different distances from each other, and means for operatively connecting the mechanism for moving the chains to different distances from each other with the mechanism for driving the chains, substantially as described.

6. In a mechanism of the class described, the combination of a framework, a plurality of suspended chains movably mounted and having depending loop portions supported by such framework, a dynamo or similar source of power, and mechanism for driving such chains and for raising the loop portions thereof operatively connected with and adapted to be operated by the same source of power, substantially as described.

7. In a mechanism of the class described, the combination of a framework, a plurality of suspended chains movably mounted and having depending loop portions supported by such framework, means for supporting one of such chains and permitting it to be moved to different distances from the other, and means for driving the chains provided with means for raising and lowering the flue-containing loop portions thereof, substantially as described.

8. In a mechanism of the class described, the combination of a framework, a tank, a plurality of suspended chains movably mounted and having depending loop portions supported by such framework over and extending transversely of the track, and mechanism for driving such chains provided with means for raising and lowering the loop portions thereof, substantially as described.

9. In a mechanism of the class described, the combination of a framework, a tank, a plurality of suspended chains movably mounted and having depending loop portions supported by such framework, means for moving one of such chains to different distances from the other, mechanism for driving such chains provided with means for raising and lowering the loop portions thereof into and out of the tank, and means for limiting the longitudinal movement of the flues contained in the loop portions of such chains, substantially as described.

10. In a mechanism of the class described, the combination of a tank, track-rails extending longitudinally of such tank, a framework, suspended chains supported by such framework and having loop portions extending into such tank and transversely thereof, means for driving such chains, and means for spreading the downwardly-extending portions of the chain mechanism to opposite sides of the track formed by such track-rails, substantially as described.

11. In a mechanism of the class described, the combination of a pair of track-rails, a framework extending above such track-rails, chain mechanism supported by such framework and having depending loop portions extending transversely of the track, and track-rail portions each movable to open position to permit a loop portion of such chain mechanism to pass from one side to the other of the rail, substantially as described.

12. In a mechanism of the class described, the combination of a pair of track-rails, a framework extending above such track-rails, chain mechanism supported by such framework and having depending loop portions extending transversely of the track, track-rail portions each movable to open position to permit a loop portion of such chain mechanism to pass from one side to the other of the rail, and means for spreading the sides of a loop portion of the chain mechanism to the outside of such track-rails, substantially as described.

13. In a mechanism of the class described, the combination of a pair of track-rails, a framework extending above such track-rails, chain mechanism supported by such framework and having depending loop portions extending transversely of the track, track-rail portions each movable to open position to permit a loop portion of such chain mechanism to pass from one side to the other of the rail, and means for supporting and permitting the movement of one of such loop portions to different distances from the other, substantially as described.

14. In a mechanism of the class described, the combination of a framework, a driven shaft rotatably mounted in such framework and provided with sprocket-wheels mounted thereon, an idler-shaft extending parallel with such driven shaft and provided with idler sprocket-wheels mounted in alinement with the sprocket-wheels upon such driven shaft, chains suspended from such sprocket-wheels each having a depending loop portion in engagement with one of such idler sprocket-wheels and with one of the sprocket-wheels upon the driven shaft, and means for preventing the rotation of either of such shafts as desired, substantially as described.

15. In a mechanism of the class described, the combination of a framework, a driven shaft rotatably mounted in such framework and provided with sprocket-wheels mounted thereon, an idler-shaft extending parallel with such driven shaft and provided with idler sprocket-wheels mounted in alinement with the sprocket-wheels upon such driven shaft, chains suspended from such sprocket-wheels each having a depending loop portion in engagement with one of such idler sprocket-wheels and with one of the sprocket-wheels upon the driven shaft, means for preventing the rotation of such idler sprocket-wheels, and track-rails extending beneath such loop portions and provided with movable rail portions for permitting the passage of loop portions of the chain mechanism from one side to the other of such track-rails, substantially as described.

16. In a mechanism of the class described, the combination of a tank, a framework extending over such tank, sprocket-wheels supported by such framework, chains suspended from such sprocket-wheels and having loop portions extending into the tank, mechanism for driving such sprocket-wheels and thereby the chains provided with means for raising and lowering the loop portions of the chains into and out of the tank, and track-rails extending longitudinally of the tank each provided with a movable portion for permitting the chain mechanism to be passed from the inside to the outside of such rails, substantially as described.

17. In a mechanism of the class described, the combination of a tank, a framework extending over such tank, sprocket-wheels supported by such framework, chains suspended from such sprocket-wheels and having loop portions extending into the tank, mechanism for driving such sprocket-wheels and thereby the chains provided with means for raising and lowering the loop portion of the chains into and out of the tank, track-rails extending longitudinally of the tank each provided with a movable portion for permitting the chain mechanism to be passed from the inside to the outside of such rails, and means for spreading the loop portion of one of such chains to the outside of such track-rails for permitting a loaded car to pass through the loop portion of such chain, substantially as described.

18. In a mechanism of the class described, the combination of a tank, a framework extending over such tank, sprocket-wheels supported by such framework, chains suspended from such sprocket-wheels and having loop portions extending into the tank, mechanism for driving such sprocket-wheels and thereby the chains provided with means for raising and lowering the loop portion of the chains into and out of the tank, track-rails extending longitudinally of the tank each provided with a movable portion for permitting chain mechanism to be passed from the inside to the outside of such rails, means for spreading the loop portion of one of such chains to the outside of such track-rails for permitting a car to pass through the loop portion of such chain, and means for moving one of such chains to different distances from the other, substantially as described.

19. In a mechanism of the class described, the combination of a supporting-framework, a driven shaft rotatably mounted in such supporting-framework and provided with sprocket-wheels mounted thereon, idler sprocket-wheels rotatably mounted in alinement with the sprocket-wheels upon such driven shaft, chains suspended from such sprocket-wheels each having a loop portion in engagement with one of such idler sprocket-wheels and with one of the sprocket-wheels upon the driven shaft, and means for moving one of the sprocket-wheels upon such driven shaft and the idler sprocket-wheel in alinement therewith longitudinally of the driven shaft, substantially as described.

20. In a mechanism of the class described, the combination of a supporting-framework, a driven shaft rotatably mounted in such supporting-framework and provided with sprocket-wheels mounted thereon, idler sprocket-wheels rotatably mounted in alinement with the sprocket-wheels upon such driven shaft, chains suspended from such sprocket-wheels each having a loop portion in engagement with one of such idler sprocket-wheels and with one of the sprocket-wheels upon the driven shaft, means for moving one of the sprocket-wheels upon such driven shaft and the idler sprocket-wheel in alinement therewith longitudinally of the driven shaft, and means for preventing the rotation of such idler sprocket-wheels during the rotation of the driven shaft with its sprocket-wheels and thereby permitting the raising of the loop portions of the chain when desired, substantially as described.

21. In a mechanism of the class described, the combination of a supporting-framework, a driven shaft rotatably mounted in such supporting-framework and connected with a suitable source of power, a sprocket-wheel mounted upon and in fixed relation to such driven shaft, an idler sprocket-wheel mounted in alinement with such sprocket-wheel, a chain suspended from such spocket-wheels and having a depending loop portion, a carriage movably mounted upon the supporting-framework and provided with sprocket-wheels movable therewith, and a chain suspended from the sprocket-wheels of such carriage having a depending loop portion, substantially as described.

22. In a mechanism of the class described, the combination of a supporting-framework, a driven shaft rotatably mounted in such supporting-framework and connected with a suitable source of power, a sprocket-wheel mounted upon and in fixed relation to such driven shaft, an idler sprocket-wheel mounted in alinement with such sprocket-wheel, a chain suspended from such sprocket-wheels and having a depending loop portion, a carriage movably mounted upon the supporting-framework and provided with sprocket-wheels movable therewith, a chain suspended from the sprocket-wheels of such carriage having a depending loop portion, and means for moving such carriage and thereby the sprocket-wheels and chain mechanism supported thereby, substantially as described.

23. In a mechanism of the class described, the combination of a supporting-framework, a driven shaft rotatably mounted in such supporting-framework and connected with a suitable source of power, a sprocket-wheel mounted upon and in fixed relation to such driven shaft, an idler sprocket-wheel mounted in alinement with such sprocket-wheel, a chain suspended from such sprocket-wheels and having a depending loop portion, a carriage movably mounted upon the supporting-framework and provided with sprocket-wheels movable therewith, a chain suspended from the sprocket-wheels of such carriage having a depending loop portion, and threaded rods operatively connected with such carriage for moving it and thereby the sprocket-wheels and chain mechanism supported thereby, substantially as described.

24. In a mechanism of the class described, the combination of a supporting-framework, a driven shaft rotatably mounted in such supporting-framework and connected with a suitable source of power, a sprocket-wheel mounted upon and in fixed relation to such driven shaft, an idler sprocket-wheel mounted in alinement with such spocket-wheel, a chain suspended from such sprocket-wheels and having a depending loop portion, a carriage movably mounted upon the supporting-framework and provided with sprocket-wheels movable therewith, a chain suspended from the sprocket-wheels of such carriage having a depending loop portion, threaded rods operatively connected with such carriage for moving it and thereby the sprocket-wheel and chain mechanism supported thereby, a rotatable shaft connecting such idler sprocket-wheels, and brake mechanism for preventing the rotation of such shaft and the idler sprocket-wheels mounted thereon during the rotation of the driven shaft with its sprocket-wheels when desired, substantially as described.

25. In a mechanism of the class described, the combination of a supporting-framework, a driven shaft rotatably mounted in such supporting-framework and connected with a suitable source of power, a sprocket-wheel mounted upon and in fixed relation to such driven shaft, an idler sprocket-wheel mounted in alinement with such sprocket-wheel, a chain suspended from such sprocket-wheels and having a depending loop portion, a carriage movably mounted upon the supporting-framework and provided with sprocket-wheels movable therewith, a chain suspended from the sprocket-wheels of such carriage having a depending loop portion, threaded rods operatively connected with such carriage for moving it and thereby the sprocket-wheels and chain mechanism supported thereby, means for preventing the rotation of the idler sprocket-wheels during the rotation of such main driven shaft when desired, and means for preventing the backward rotation of such main driven shaft, substantially as described.

26. In a mechanism of the class described, the combination of a framework, a driven shaft rotatably mounted in such framework and provided with sprocket-wheels mounted thereon, an idler-shaft extending parallel with such driven shaft and provided with idler sprocket-wheels mounted in alinement with the sprocket-wheels upon such driven shaft, chains suspended from such sprocket-wheels each having a depending loop portion in engagement with one of such idler sprocket-wheels and with one of the sprocket-wheels upon the driven shaft, and a carriage movably mounted upon such framework in engagement with one of the sprockets on the driven shaft and with the idler sprocket-wheel in alinement therewith for moving such sprocket-wheels upon the shafts, substantially as described.

FRANK H. ADAMS.

Witnesses:
L. M. GAZIN,
N. C. STORM.